United States Patent
Suzuki

(10) Patent No.: US 7,542,028 B2
(45) Date of Patent: Jun. 2, 2009

(54) DEVICE FOR CONTROLLING CONVERSION RATIO OF MOVEMENT AMOUNT OF CURSOR AND METHOD THEREOF

(75) Inventor: Shoji Suzuki, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 672 days.

(21) Appl. No.: 11/149,814

(22) Filed: Jun. 10, 2005

(65) Prior Publication Data

US 2006/0007140 A1 Jan. 12, 2006

(30) Foreign Application Priority Data

Jun. 22, 2004 (JP) .............................. 2004-184117

(51) Int. Cl.
*G09G 5/08* (2006.01)
(52) U.S. Cl. ....................... 345/157; 345/156; 345/158; 345/163
(58) Field of Classification Search ......... 345/156–158, 345/163
See application file for complete search history.

(56) References Cited

U.S. PATENT DOCUMENTS 7,164,810 B2 * 1/2007 Schnee et al. ............... 382/313
2004/0119682 A1 * 6/2004 Levine et al. ............... 345/156

FOREIGN PATENT DOCUMENTS

JP 2737711 1/1998

* cited by examiner

*Primary Examiner*—Richard Hjerpe
*Assistant Examiner*—Leonid Shapiro
(74) *Attorney, Agent, or Firm*—Brinks Hofer Gilson & Lione

(57) ABSTRACT

A device for controlling a conversion ratio of a movement amount of a cursor includes units that: confirms whether a change of resolution is within a correction target range, based on resolution information obtained by a display terminal device; that calculate the movement amount of input values obtained from a pointing device; calculate a movement correction coefficient according to the calculated movement amount calculate a ratio correction coefficient based on a ratio of the resolution to a reference resolution; calculate a display correction coefficient based on the movement correction coefficient and the ratio correction coefficient; and calculate output values determining the movement amount of the cursor, based on the display correction coefficient and the input values.

6 Claims, 2 Drawing Sheets

DEVICE FOR CONTROLLING CONVERSION RATIO OF MOVEMENT AMOUNT OF CURSOR AND METHOD THEREOF

This application claims the benefit of priority to Japanese Patent Application No. 2004-184117 filed on Jun. 22, 2004, herein incorporated by reference.

BACKGROUND OF THE INVENTION

1. Field of the Invention

The present invention relates to a device for controlling a conversion ratio of a movement amount of a cursor with respect to a speed, and a method thereof. More particularly, it relates to a device for controlling a conversion ratio of a movement amount of a cursor which is capable of conveniently operating a pointing device even if the setup of an aspect ratio or resolution of a display is changed, and a method thereof.

2. Description of the Related Art

In personal computers (which are generally referred to as PCs) currently coming into widespread use, commands input through an input device, such as a pointing device (for example, a mouse, a track ball, or a touch screen) or a keyboard, are transmitted to a PC main body to operate applications, such as word processing software, table calculating software, and internet browsing software.

The pointing device (hereinafter, referred to as a 'device'), which is one kind of input devices, is a representative input device of the PC employing GUI (graphical user interface) that is currently being used. That is, since a PC not equipped with the device has difficulty in operability, the device is positively necessary.

The device divides an input operation into an x component (the horizontal direction) and a y component (the vertical direction) and then converts them into signals (hereinafter, referred to as 'input values'). The input values are transmitted to a PC main body, and are converted into output values by being calculated using a program provided in the PC main body. Subsequently, the output values are transmitted from the PC main body to a display terminal device (hereinafter, referred to as a 'display'), so that a cursor moves on the display according to the output values. That is, since the operation of the device is directly connected with the operation of the cursor, an operator of the device feels unpleasant when the cursor is not operated well or moves in an unintended direction.

A change in the resolution of the device may cause the poor operation of the cursor or the movement thereof in the unintended direction.

When the resolution of the device is changed, an image display region is changed although the size of the display is the same. For example, when the resolution is changed from VGA (which has a display resolution of 640 by 480 pixels) to SXGA (which has a display resolution of 1280 by 1024 pixels), the image sizes of the x component or the y component on the screen are doubled (the size of the image display region increases by four times). That is, in order to move the cursor by the same distance as that before the resolution is changed, the operator of the device needs to input, to the device, the amount of movement two times larger than that before the resolution is changed. Therefore, the operator of the device cannot move the cursor with high operability.

These conventional problems have been raised before. It has been attempted to solve the problems by some measures. Among them, a function of controlling the movement amount of a cursor of a pointing device has been used as a more effective measure (see Japanese Patent No. 2737711).

The function of controlling the movement amount of a cursor of a pointing device (hereinafter, referred to as a 'prior art') is a technology that includes a device for detecting a change of a resolution and moves a cursor by applying the conversion ratio (conversion ratio means a ratio of a resolution after change to a resolution before change, hereinafter, referred to as a 'simple conversion ratio') to the movement amount of a device. The conversion ratio is obtained by calculation from resolutions before change and after change.

An advantage of the prior art is that the movement amount of a cursor on the screen is not changed between before and after change of the resolutions, although high-resolution (which means more than XGA (resolution of 1280 by 768 pixels) for 14 inch (diagonal display area)) is set. Therefore, according to the prior art, excessive movement amount should be input to the device to achieve the complete movement of a cursor.

However, since the display capacity of a display has been rapidly advanced, various problems arise when the development of a new technique does not keep up with the advance of the display capacity.

According to the display capacity of the display current being used, it is possible to select considerably higher resolution, such as QUXGA (which has a display resolution of 3200 by 2400 pixels). Therefore, when the resolution is changed to a resolution higher than a certain level, the minute operability of a cursor is remarkably deteriorated in the related art. For example, it may be easy to roughly move the cursor, but it may be difficult to minutely move the cursor.

Further, displays having different aspect ratios (the ratio of length to width) from that in the prior art, that is, so-called wide displays, can be used for personal computers. In this case, a problem caused by a change of an aspect ratio arises in addition to a problem caused by the change of resolution to the previously determined value. For example, when the resolution is changed from XGA having an aspect ratio of 4:3 to WXGA (which has a display resolution of 1280 by 720 pixels) having an aspect ratio of 16:9, a simple conversion ratio is extended in the horizontal direction by one and a quarter times, and is reduced by 0.94 times in the vertical direction. That is, when the aspect ratio is changed, a difference in conversion ratio occurs in the horizontal direction and the vertical direction. As a result, the movement amount of the cursor may be different in the horizontal direction and the vertical direction. Then, the movement amount of the cursor is excessively corrected by the change of the aspect ratio, which causes the cursor to be moved in an unintended direction.

SUMMARY OF THE INVENTION

The present invention is designed to solve the above-mentioned problems, and it is an object of the invention to provide a device for and a method of controlling a conversion ratio of the movement amount of a cursor to a speed thereof capable of achieving minute operability and usability at high resolution and of coping with the change of an aspect ratio.

In order to achieve the above object, according to a first aspect of the invention, a device for controlling a conversion ratio of a movement amount of a cursor determines the movement amount of the cursor in a display terminal device by reflecting resolution information obtained by the display terminal device in input values obtained by a pointing device. The device includes an aspect ratio confirming unit that confirms whether the change of resolution is within a correction target range, based on the resolution information obtained by the display terminal device; a movement amount calculating unit that calculates the movement amount of the input values obtained by the pointing device; a movement correction coefficient calculating unit that calculates a movement correction coefficient according to the movement amount calculated by the movement amount calculating unit; a ratio correction coefficient calculating unit that calculates a ratio correction coefficient based on a ratio of the resolution obtained by the display terminal device to a reference resolution; a display correction coefficient calculating unit that calculates a display correction coefficient based on the movement correction coefficient and the ratio correction coefficient; and an output value calculating unit that calculates output values determining the movement amount of the cursor, based on the display correction coefficient and the input values.

Further, according to a second aspect of the invention, it is preferable that the aspect ratio confirming unit output the input values to the movement amount calculating unit, only when the information on the change of the aspect ratio obtained by the display terminal device is within the correction target range.

Furthermore, according to a third aspect of the invention, it is preferable that the movement correction coefficient calculating unit use a common value as the movement correction coefficient reflected in the output values composed of an x component and a y component that determine the movement amount of the cursor.

Moreover, according to a fourth aspect of the invention, a method of controlling a conversion ratio of a movement amount of a cursor determines the movement amount of the cursor in a display terminal device by reflecting resolution information obtained by the display terminal device in input values obtained by a pointing device. The method includes the following steps of: calculating a display correction coefficient based on a ratio correction coefficient obtained by a change of resolution and a movement correction coefficient determined by the input values; and reflecting output values obtained from the display correction coefficient and the input values in the movement amount of the cursor.

Further, according to a fifth aspect of the invention it is preferable that information on a change of an aspect ratio that indicates the resolution obtained by the display terminal device be reflected in the output values, only when the change of the resolution is within the correction target range.

Furthermore, according to a sixth aspect of the invention, it is preferable that a common value be used as the movement correction coefficient reflected in the output values composed of an x component and a y component that determine the movement amount of the cursor.

When the device for controlling the conversion ratio of the movement amount of the cursor according to the first aspect of the invention is operated by the method of the invention, it is possible to achieve minute operability and usability at high resolution and to cope with the change of an aspect ratio. The invention is different from a technique of controlling the movement amount of a cursor using the conversion ratio of resolution, and input values from a device is also considered as the conversion ratio in the invention, which makes it possible to reliably secure the minute operability of a device.

When the device for controlling the conversion ratio of the movement amount of the cursor according to the second aspect of the invention is operated by the method of the invention, it is possible to prevent the movement amount of a cursor to be excessively corrected in a display terminal device having a specific aspect ratio.

When the device for controlling the conversion ratio of the movement amount of the cursor according to the third aspect of the invention is operated by the method of the invention, a different in the movement amount of the cursor does not occur in the x component and the y component.

DESCRIPTION OF THE PREFERRED EMBODIMENT

Hereinafter, preferred embodiments of a device for controlling a conversion ratio of the movement amount of a cursor to a speed thereof and a method thereof of the invention will be described with reference to FIGS. 1 and 2.

Figure 1:
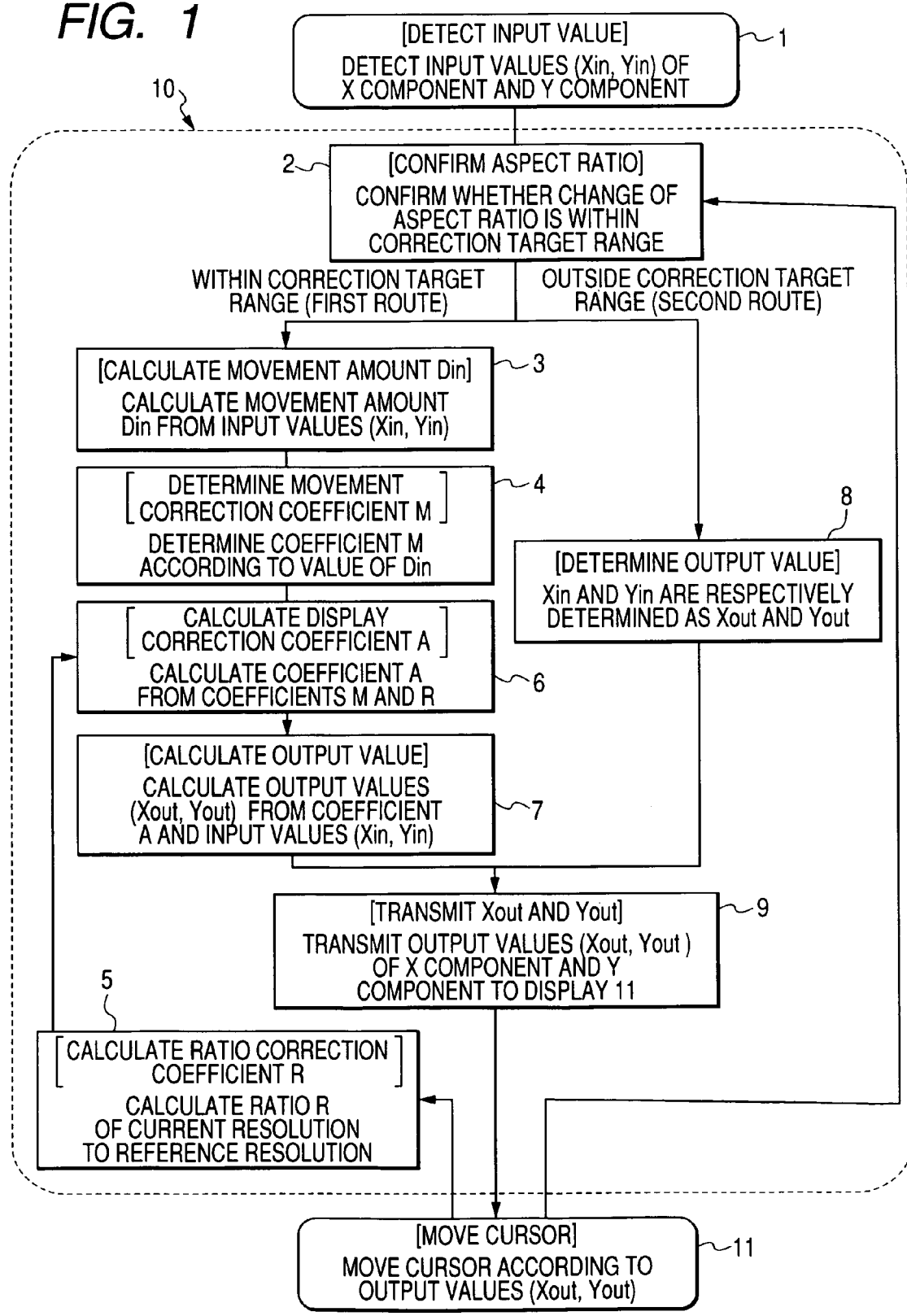
FIG. 1 is a block diagram illustrating the structure of the invention.

FIG. 1 is a flow chart illustrating a method of controlling the conversion ratio of the movement amount of a cursor to the speed thereof in the device for controlling the conversion ratio of the movement amount of the cursor and other components. The device for controlling the conversion ratio of the movement amount of the cursor and the method therefore will be described below with reference to FIG. 1.

First, when a device 1 is operated to detect an input value, the input value is transmitted to an aspect ratio confirming unit 2 in a PC main body 10. Then, the aspect ratio confirming unit 2 confirms whether the change of the aspect ratio of the input value transmitted to the PC main body 10 is within the correction target range. According to the result of the confirmation, a processing route is divided into a first route (in the correction target range) and a second route (outside the correction range). In the first route, the input value is converted into an output value via a movement amount calculating unit 3, a movement correction coefficient calculating unit 4, a ratio correction coefficient calculating unit 5, a display correction coefficient calculating unit 6, and an output value calculating unit 7 in this order. On the other hand, in the second route, the input value is converted into an output value via an output value determining unit 8. Then, the input value having passed through the first or second route is output to a display 11 via an output value transmitting unit 9, and a cursor moves on the display 11 according to the output value. Hereinafter, calculating steps of the conversion ratio controlling method will be described in detail.

In step 1, the movement amount obtained by the device 1 is divided into input values (Xin, Yin) of an x component and a y component to be transmitted to the PC main body 10.

In the PC main body 10, the aspect ratio confirming unit 2 confirms the change of the aspect ratio. When the change of the aspect ratio is in the correction target range, the first route is selected, and the input values (Xin, Yin) are transmitted to the movement amount calculating unit 3.

A device movement amount Din is calculated from the input values (Xin, Yin) transmitted to the movement amount calculating unit 3 by the following expression 1:

$$D\text{in} = \{(X\text{in})^2 + (Y\text{in})^2\}^{1/2} \quad (1).$$

Then, the device movement amount Din is transmitted to the movement correction coefficient calculating unit 4.

The movement correction coefficient calculating unit 4 determines a movement correction coefficient M with reference to the device movement amount Din calculated in the movement amount calculating unit 3. As shown in FIG. 2, the movement correction coefficient M is changed by the device movement amount Din. That is, the following relationships are satisfied:

when $D_{in} < T_0$, $M = M_0$,
when $T_0 \leq D_{in} < T_1$, $M = M_1$, and
when $T_1 \leq D_{in}$, $M = M_2$.

Here, the first boundary value $T_0$ and the second boundary value $T_1$ can be set arbitrarily, and the value of the movement correction coefficient M can also be set arbitrarily. The movement correction coefficient M has different values at the boundaries separated between the respective boundary values.

The movement correction coefficient M determined by the movement correction coefficient calculating unit 4 is transmitted to a next display correction coefficient calculating unit 6 to calculate a display correction coefficient A. In order to calculate the display correction coefficient A, a ratio correction coefficient R obtained from the ratio correction coefficient calculating unit 5 is needed. The ratio correction coefficient R is calculated by the following expression 2:

$$R = Xw/Xb \quad (2),$$

where Xw indicates the current resolution of the x component, and Xb indicates the reference resolution of the x component.

Then, the display correction coefficient calculating unit 6 calculates the display correction coefficient A, based on the movement correction coefficient M and the ratio correction coefficient R, using the following expression 3:

$$A = 1 + M(R-1)/100 \quad (3).$$

In the above-mentioned expression 3, when (R−1)=0, that is, when the current resolution Xw is equal to the reference resolution Xb, the coefficient A is always 1.

The display correction coefficient A obtained by the display correction coefficient calculating unit 6 is transmitted to a next output value calculating unit 7 to calculate output values (Xout, Yout). The output values (Xout, Yout) are calculated by the following expressions 4 and 5:

$$Xout = A \times Xin \quad (4), \text{ and}$$

$$Yout = A \times Yin \quad (5).$$

The output values (Xout, Yout) calculated by the output value calculating unit 7 is transmitted to the output value transmitting unit 9 and is then transmitted to the display 11.

The output values (Xout, Yout) transmitted to the display 11 are reflected as the movement amount of the cursor displayed on the display 11.

Further, when the change of the aspect ratio confirmed by the aspect ratio confirming unit 2 is outside the correction target range, the second route is selected, and the input values (Xin, Yin) of the device 1 is transmitted to the output value determining unit 8.

The output value determining unit 8 determines the input values (Xin, Yin) of the device 1 as the output values (Xout, Yout), and the output values (Xout, Yout) are transmitted to the output value transmitting unit 9. Then, the output values (Xout, Yout) are transmitted to the display 11 from the output value transmitting unit 9, and then are reflected as a movement amount of the cursor on the display. Here, the reason why correction is not performed when the change of the aspect ratio is outside the correction target range is that an excessive amount of correction has a bad influence on the movement amount of the cursor, which causes the operability of the device to be deteriorated, as above-mentioned.

EXAMPLE

Next, the method of the invention will be described in detail using parameters shown in table 1.

Various parameters shown in the table 1 are used for setting a program by the way of registry, according to the method of controlling the conversion ratio of the movement amount of the cursor in accordance with the invention. The term 'registry' means a database registered with data required for setting a system and applications in Windows-based operating systems (OSs) having a higher version than Windows 95 (Windows is a registered trademark of Microsoft Corporation). A method of setting various parameters will be described in detail at the very last of this example.

As shown in the table 1, a total of eleven parameters are used in the invention.

TABLE 1

Parameters used for a program for controlling the conversion ratio of the movement amount of a cursor

| Name | Symbol | Description | Range | Initial setup |
|---|---|---|---|---|
| ISDR_Enable | — | Determine whether to use the invention. | 1: use 2: not use | 0 |
| ISDR_ResolXBase | Xb | The reference resolution of an X component | Xb > 0 | 1024 |
| ISDR_ResolXMin | — | The minimum resolution capable of using the invention (the X component) (The movement amount of a cursor is not controlled below the minimum resolution) | >0 | 1680 |
| ISDR_ResolXMax | — | The maximum resolution capable of using the invention (the X component) (The movement amount of a cursor is controlled with the resolution before change above the maximum resolution) | >0 | 4096 |
| ISDR_AspectRatioMin | — | The minimum aspect ratio capable of using the invention [note 1] (No operation is performed below the minimum aspect ratio) | >0 | 160 |

TABLE 1-continued

Parameters used for a program for controlling the conversion ratio of the movement amount of a cursor

| Name | Symbol | Description | Range | Initial setup |
|---|---|---|---|---|
| ISDR_AspectRatioMax | — | The maximum aspect ratio capable of using the invention [note 1] (No operation is performed above the maximum aspect ratio) | >0 | 160 |
| ISDR_Threshold_0 | $T_0$ | The first boundary value [note 2] | $T_0 > 0$ | 1024 |
| ISDR_Threshold_1 | $T_1$ | The second boundary value [note 3] (It is prescribed that $T_1 \geq T_0$) | $T_1 > 0$ | 4096 |
| ISDR_Multiplier_0 | $M_0$ | A movement correction coefficient of the first boundary [note 4] | $M_0 \geq 0$ | 0 |
| ISDR_Multiplier_1 | $M_1$ | A movement correction coefficient of the second boundary [note 5] | $M_1 \geq 0$ | 30 |
| ISDR_Multiplier_2 | $M_2$ | A movement correction coefficient of the third boundary [note 6] | $M_2 \geq 0$ | 100 |

Figure 2:
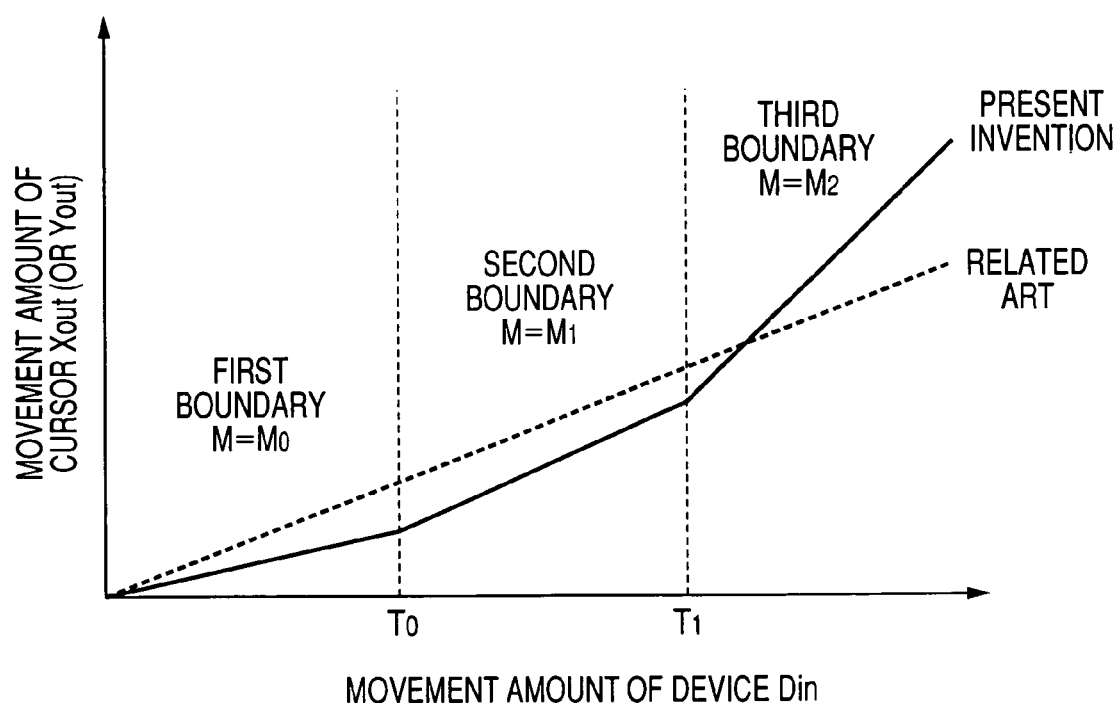
FIG. 2 is a graph illustrating the relationship between a boundary value T and a movement correction coefficient M.

[note 1] aspect ratio = (the resolution of the x component/the resolution of the y component) × 100
[notes 2, 3, 4, 5, and 6] for each boundary value and each boundary, see FIG. 2.

Next, the items shown in table 1 will be described from the upper item.

First, ISDR_Enable, the first item, is used for determining whether to use the invention. In order to set the first item, '1: use' or '0: not use' is selected. Initial setup of the first item is set as '0: not use'. Of course, when using the invention, it is necessary to select '1: use'.

ISDR_ResolXBase, the second item, indicates the reference resolution of the x component, and is represented by a symbol Xb. Xb is set over zero, and has an initial setup value of 1024, which is equal to a value of XGA in the horizontal direction. When Xb is initially set smaller than XGA, the invention cannot be used. However, the invention can be used at the resolution lower than XGA by changing the initial setup value.

The value of ISDR_ResolXBase is limited to the x component. This is because the aspect ratio currently used is set almost to 4:3 or 16:9. That is, when the resolution is set using only the x component, the number of items to be set and the number of calculating processes are reduced, which enables a system with a simple structure. In this case, the resolution of the x component is used only to just simplify the structure of a system. Therefore, when the reference resolution of the y component is added to the setup items, the invention can be used at aspect ratios other than the aspect ratio currently coming into widespread use. Since values of resolution to be described later are set for the same reason, the resolution values of the y component may be properly added, if necessary.

ISDR_ResolXMin, the first item, is the minimum resolution (the x component) capable of using the invention. That is, the control for the movement amount of a cursor, which is the effect of the invention, is not performed below the minimum resolution capable of using the invention. The setup range of the minimum resolution is larger than zero, and the initial setup value is '1680'.

ISDR_ResolXMax, the fourth item, is the maximum resolution (the x component) capable of using the invention. The control for the movement amount of a cursor is performed at the resolution before change when the resolution is larger than the maximum resolution capable of using the invention. This makes it possible to properly operate a device even over the maximum resolution. The setup range of the maximum resolution is larger than zero (which is larger than the value prescribed to ISDR_ResolXMin), and the initial setup value is '4096'. Of course, the maximum resolution may be larger than this initial setup value.

ISDR_ResolXMax, the fifth item, is the minimum aspect ratio capable of using the invention. Here, the aspect ratio represented by the note 1 in the table 1 is calculated by the following expression:

aspect ratio=(the resolution of the x component)/(the resolution of the y component)×100. The setup range of the minimum aspect ratio is larger than zero, and the initial setup value thereof is '160'.

ISDA_AspectRatioMax, the sixth item, is the maximum aspect ratio capable of using the invention. The setup range of the aspect ratio is larger than zero (that is, the setup range is larger than the value prescribed to ISDR_AspectRatioMin), and the initial setup value thereof is '160', which is equal to that of ISDR_AspectRatioMin. That is, when the maximum aspect ratio is changed from 160 (which means that the aspect ratio of the resolution is 4:3), the control for the movement amount of the cursor according to the invention is not performed at the initial setup value (that is, by way of the second route shown at the right side of FIG. 1). In this example, the change of the aspect ratio is not permitted in the initial setting. When the value ISDR_AspectRationMin or ISDR_AspectRationMax is changed, it is possible to use the invention although the aspect ratio is different.

IDSR_Threshold_0, The seventh item, is the first boundary value shown in FIG. 2, and is represented by a symbol $T_0$. ISDR_Threshold_0 is set to satisfy $T_0>0$, and the initial setup value thereof is 1024. That is, when the initial setup value thereof exceeds the device movement amount Din=$T_0$=1024 (Din=32 (pixels)) (Din>32 (pixels)), the following movement correction coefficient M is changed from $M_0$ into $M_1$.

ISDR_Threshold_1, the eighth item, is the second boundary value shown in FIG. 2, and is represented by a symbol $T_1$. ISDR_Threshold_0 is set to satisfy $T_1>0$ and $T_1 \geq T_0$, and the initial setup value thereof is 4096. That is, when the initial setup value thereof exceeds the device movement amount Din=$T_1$=4096 (Din=64 (pixels)) (Din>64 (pixels)), the following movement correction coefficient M is changed from $M_1$ into $M_2$.

ISDR_Multiplier_0, ISDR_Multiplier 1, and ISDR_Multiplier_2, the ninth, tenth, and eleventh items, are movement correction coefficients M of the first, second, and third boundaries, and are represented by symbols $M_0$, $M_1$, and $M_2'$ respectively. The respective movement correction coefficients $M_0$, $M_1$, and $M_2$ are set larger than zero, and the initial setup values of the coefficients $M_0$, $M_1$, and $M_2$ are 0, 30, and 100, respectively.

For example, when M is equal to $M_0$, the value of the display correction coefficient A is 1 according to the above-mentioned expression 3. When the initial setup value of the coefficient $M_0$ is zero, correction is not performed. As described above, the movement correction coefficient M varies depending on the device movement amount Din. Therefore, as the value of Din becomes larger (the amount of movement increases), the display correction coefficient A becomes larger. As such, it is possible to vary the display correction coefficient A according to the amount of movement by changing the movement correction coefficient M at each boundary.

When the invention is set by way of the registry based on the contents described in the table 1, the parameters and the set values thereof (hereinafter, referred to as 'dword values') described in the table 1 are input to a registry key using Windows Registry Editor included in Windows-based operating systems.

The set contents of the dword values can be freely changed according to use environment. Here, a program for controlling the conversion ratio of the movement amount of a cursor may be set by way of an INF file, not by way of the registry. The term 'INF file' means an information file required for the setup of an operating system or applications.

In this embodiment, Windows is used as an operating system. However, the invention can be applied to various operating systems, such as Mac OS (which is a registered trademark of Apple Computer, Inc.), when any PC equipped with a pointing device is used. In addition, the invention can be applied to PCs that do not depend on OSs, when any systems for managing devices are provided therewith.

According to the invention, it is possible to secure the high operability of a device, not depending on the ratio (conversion ratio) of the change of resolution. That is, when the movement amount of a device is small, the movement amount of a cursor becomes smaller than the related art. When the movement amount of a device is great, the movement amount of a cursor becomes greater than the related art. Therefore, it is possible for an operator of a device to move a cursor with high operability.

As described above, a device for and a method of controlling a conversion ratio of the movement amount of a cursor having the above-mentioned structure and effects do not have a bad influence on the movement amount of the cursor even if the resolution or aspect ratio of a device is changed, which makes it possible to always maintain the high operability of a device.

Further, the invention is not limited to the above-mentioned embodiment, but various modifications and changes can be made without departing from the scope and sprit of the invention, if necessary.

The invention claimed is:

1. A device for controlling a conversion ratio of a movement amount of a cursor that determines the movement amount of the cursor in a display terminal device by reflecting resolution information obtained by the display terminal device in input values obtained by a pointing device, comprising:

an aspect ratio confirming unit that confirms whether a change of resolution is within a correction target range, based on the resolution information obtained by the display terminal device;

a movement amount calculating unit that calculates the movement amount of the input values obtained by the pointing device;

a movement correction coefficient calculating unit that calculates a movement correction coefficient according to the movement amount calculated by the movement amount calculating unit;

a ratio correction coefficient calculating unit that calculates a ratio correction coefficient based on a ratio of the resolution obtained by the display terminal device to a reference resolution;

a display correction coefficient calculating unit that calculates a display correction coefficient based on the movement correction coefficient and the ratio correction coefficient; and an output value calculating unit that calculates output values determining the movement amount of the cursor, based on the display correction coefficient and the input values, wherein the aspect ratio confirming unit outputs the input values to the movement amount calculating unit, only when information on a change of the aspect ratio obtained by the display terminal device is within the correction target range.

2. The device for controlling a conversion ratio of a movement amount of a cursor according to claim 1, wherein the movement correction coefficient calculating unit uses a common value as the movement correction coefficient reflected in the output values composed of an x component and a y component that determine the movement amount of the cursor.

3. The device for controlling a conversion ratio of a movement amount of a cursor according to claim 1, wherein the movement correction coefficient is changed by a device movement amount and is divided into plural values according to the movement amount.

4. A method of controlling a conversion ratio of a movement amount of a cursor that determines the movement amount of the cursor in a display terminal device by reflecting resolution information obtained by the display terminal device in input values obtained by a pointing device, comprising:

calculating a display correction coefficient based on a ratio correction coefficient obtained by a change of resolution and a movement correction coefficient determined by the input values; and reflecting output values obtained from the display correction coefficient and the input values in the movement amount of the cursor, wherein information on a change of an aspect ratio that indicates the resolution obtained by the display terminal device is reflected in the output values, only when the change of the resolution is within a correction target range.

5. The method of controlling a conversion ratio of a movement amount of a cursor according to claim 4, wherein a common value is used as the movement correction coefficient reflected in the output values composed of an x component and a y component that determine the movement amount of the cursor.

6. The method of controlling a conversion ratio of a movement amount of a cursor according to claim 4, wherein the movement correction coefficient is changed by a device movement amount and is divided into plural values according to the movement amount.

* * * * *